(12) United States Patent
Zhu

(10) Patent No.: US 6,795,501 B1
(45) Date of Patent: Sep. 21, 2004

(54) MULTI-LAYER CODER/DECODER FOR PRODUCING QUANTIZATION ERROR SIGNAL SAMPLES

(75) Inventor: Chunrong Zhu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1299 days.

(21) Appl. No.: 08/965,637

(22) Filed: Nov. 5, 1997

(51) Int. Cl.[7] .................................................. H04N 7/12
(52) U.S. Cl. ................................................ 375/240.03
(58) Field of Search ................................ 348/384, 390, 348/391, 393, 395, 403, 404, 405, 419, 400, 401, 402, 409, 415, 416; 382/251, 252, 232, 236, 238; 341/200, 67; H04N 7/12

(56) References Cited

U.S. PATENT DOCUMENTS

| | | | |
|---|---|---|---|
| 5,363,139 A | | 11/1994 | Keith |
| 5,398,078 A | * | 3/1995 | Masuda et al. ............. 348/699 |
| 5,729,293 A | * | 3/1998 | Keesman .................... 348/409 |
| 5,812,699 A | * | 9/1998 | Zhu et al. ................... 348/405 |
| 5,818,531 A | * | 10/1998 | Yamaguchi et al. ........ 348/403 |
| 5,821,887 A | * | 10/1998 | Zhu ............................ 341/67 |

OTHER PUBLICATIONS

Elan Amir, Steven McCanne, Martin Vetterli, "A Layered DCT Coder For Internet Video", University of California, Berkeley, CA 94720, 4 pages.

Karel Rijkse, Contact Person, "Video Coding For Low Bitrate Communication", Draft ITU–T Recommendation H.263, Telecommunications Standardization Sector, International Telecommunication Union, Dec. 5, 1995, Cover pages (5), pp. 1–57.

Gary J. Sullivan, Contact Person, "Video Coding For Low Bitrate Communication", Draft 4 ITU–T Recommendation H.263, Telecommunications Standardization Sector, Study Group 15, International Telecommunication Union, Jan. 20, 1997, 105 pages.

Information Technology—Generic Coding Of Moving Pictures And Associated Audio Information: Video, Recommendation ITU–T H.262, International Standard 13818–2, ISO/IEC 13818–2: 1995(E), Title page, pages i–ix, pp. 1–224.

(List continued on next page.)

Primary Examiner—Young Lee
(74) Attorney, Agent, or Firm—Sharon Wong

(57) ABSTRACT

Briefly, in accordance with one embodiment of the invention, a method of producing quantization error signal samples for a layer of a multi-layer coder applied to successive video frames includes: processing in the transform domain quantization error signal samples produced by the immediately preceding layer. In this embodiment, processing includes using reference quantization error signal samples if the quantization error for the quantization error signal samples exceeds a predetermined criterion or threshold.

Briefly, in accordance with another embodiment of the invention, a method of reconstructing quantized signal samples in the transform domain for a layer of a multi-layer decoder other than a base layer includes: inverse quantizing the signal samples in the transform domain; and summing the inverse quantized signal samples with previous signal samples inverse quantized in the transform domain for this layer if the previous signal samples were subtracted during coding in the transform domain to produce the signal samples.

38 Claims, 6 Drawing Sheets

OTHER PUBLICATIONS

Ad hoc group on MPEG–4 video VM editing, MPEG–4 Video Verification Model Version 4.0, Coding of Moving Pictures And Associated Audio Information, ISO/IEC JTC1/SC29/WG11, MPEG96/N1380, Chicago, Oct. 1996, pp. 1–128.

Gary J. Sullivan, Contact, Video Group, "Altered Sections of H.263 for Draft Text of H.263+", ITU Telecommunications Standardization Sector Document: ITU–LBC–96–263, Study Group 15, pp. 1–16.

* cited by examiner

MULTI-LAYER CODER/DECODER FOR PRODUCING QUANTIZATION ERROR SIGNAL SAMPLES

BACKGROUND

1. Field of the Invention

The present invention relates to coders and/or decoders and, more particularly, to coders and/or decoders providing scalability.

2. Background Information

An area of current technical development relates to the transmission of digitized video frames over a low bandwidth or low bit rate communications medium. In this context, analog video frames are digitized or, alternatively, the digitized video frames are produced directly, such as by using a charge-coupled device (CCD) camera. Typically, to transmit these digitized video frames over a system that is band limited or has a limited bandwidth, video compression techniques are employed.

The field of video compression is well-known and a number of video compression standards have evolved, such as MPEG 1, (ISO/IEC 11172, Information Technology: coding of moving pictures and associated audio for digital storage media at up to about 1.5 Mbits/s, Part 1: Systems; Part 2: Video; Part 3: Audio; Part 4: Conformance Testing, 1993, herein incorporated by reference), MPEG2, (ISO/IEC JTC1/SC29/WG11 CD 13818, generic coding of moving pictures and associated audio, November, 1993, herein incorporated by reference), and H.263 (ITU-T SG 15 WP 15/1 Draft Recommendation H.263, video coding for low bit rate communication, Doc. LBC-95-251, October, 1995, herein incorporated by reference), for example.

One property that is desirable to have when employing video compression techniques is "scalability." In this context, a scaleable bit stream refers to a bit stream which, due to resource constraints, such as network bandwidth or processor capability, may be decoded in part, but sufficient to produce useful images. The quality "scales" with the resource limitation or constraint. This property is desirable because without it substantially the same video signal may be transmitted, for example, across many systems of differing bandwidths due at least in part to the diversity of technology available. Further, over time, bandwidth resources available may change as system resource allocations change. Therefore, it may be desirable to either reduce or improve the video quality as these resource allocations change. However, if the compression scheme employed is not scaleable, then for systems having a bandwidth in excess of a predetermined bandwidth, the video frame received will not improve in quality despite an increase in the bandwidth available. Likewise, for systems having a bandwidth below a particular bandwidth, a compressed video frame utilizing that particular bandwidth for transmission may not be transmitted successfully.

Several approaches for providing scaleable video compression have been proposed. For example, one technique referred to as "LDCT" or "layered DCT" is described in "A Layered DCT Codec for Internet Video," by E. Amir, S. McCanne, and M. Vetterli, published in Video Proc. IEEE International Conference on Image Processing, ICIP '96, Lausanne, 1996, Volume 1, pp 13–16, herein incorporated by reference. LDCT codes bit planes of transform coefficients in most significant to least significant order to realize a layered structure. Although LDCT provides a type of scalability by effectively partitioning the DCT coefficients according to relative visual effect, it has some disadvantages. One disadvantage is that the level of improvement or refinement provided by employing additional layers is limited by the quantization step employed to quantize the coefficients. As is well-known, quantization is employed in video compression. For the LDCT, because a single quantization step size is employed, employing additional layers does not result in a significant improvement in the quality of the video image received. However, one advantage of this approach is that its computationally complexity is not overwhelming. Another approach referred to as "SNR Scalability" is described in MPEG-2. See, for example, *Techniques and Standards for Image, Video and Audio Coding*, by K. R. Rao and J. J. Hwang, available from Prentice Hall, PTR, New Jersey (1996), herein incorporated by reference. Although this approach provides better image quality improvement as "enhancement layers" are employed beyond the "base layer," a disadvantage of this approach is significant computational complexity.

Unfortunately, such computational complexity may overwhelm state-of-the-art processors or microprocessors.

A need therefore exists for a scaleable coder and/or decoder that addresses the foregoing disadvantages.

SUMMARY

Briefly, in accordance with one embodiment of the invention, a method of producing quantization error signal samples for a layer of a multi-layer coder applied to successive video frames includes: processing in the transform domain quantization error signal samples produced by the immediately preceding layer. In this embodiment, processing includes using reference quantization error signal samples if the quantization error for the quantization error signal samples exceeds a predetermined criterion or threshold.

Briefly, in accordance with another embodiment of the invention, a method of reconstructing quantized signal samples in the transform domain for a layer of a multi-layer decoder other than a base layer includes: inverse quantizing the signal samples in the transform domain; and summing the inverse quantized signal samples with previous signal samples inverse quantized in the transform domain for this layer if the previous signal samples were subtracted during coding in the transform domain to produce the signal samples.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the techniques used by those skilled in the data processing arts to convey the substance of their work to others skilled in the art. An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification discussions utilizing terms such as "processing" or "computing" or calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Figure 1:
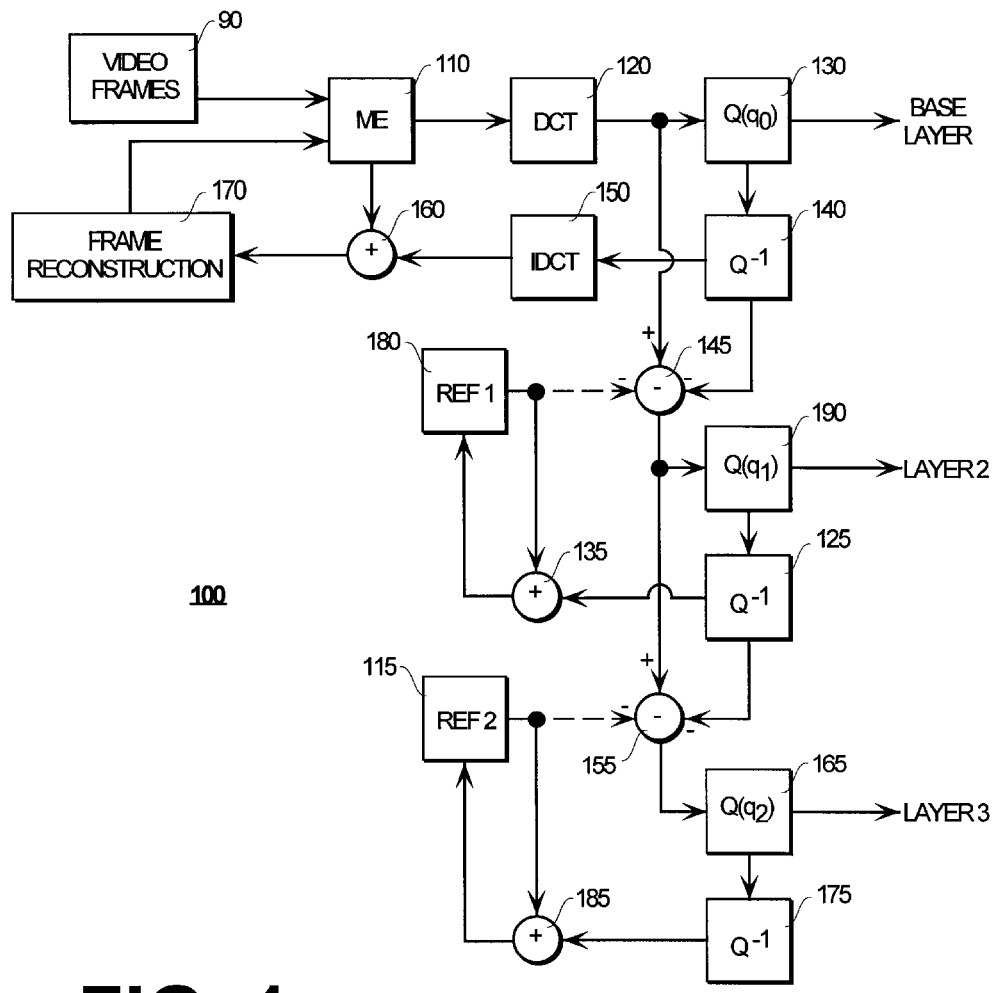
FIG. 1 is a schematic diagram illustrating an embodiment of a multi-layer coder in accordance with the invention.

FIG. 1 is a block diagram illustrating an embodiment 100 of a multi-layer coder in accordance with the invention. In this context, the term multi-layer coder or decoder includes a one layer coder or decoder with multi-pass processing. Although the invention is not restricted in scope in this respect, FIG. 1 illustrates a three-layer coder. In the embodiment, a base layer, a second layer and a third layer are illustrated. For the base layer, embodiment 100 illustrates video frames 90 applied to motion estimator (ME) 110. Motion estimation is well-known and will not be described in further detail in this patent application. See, for example, *Techniques and Standards for Image, Video and Audio Coding*, by Rao and Hwang, published by Preritice-Hall PTR, New Jersey (1996), herein incorporated by reference. As is well-known, motion estimation is employed for inter-frame coding, but is not employed for intra-frame coding. Therefore, for a first video frame applied to motion estimator 110, typically no motion estimation occurs. A video frame, in this particular embodiment, is then transformed to the discrete cosine transform (DCT) domain, such as illustrated by block 120 in FIG. 1. Of course, the invention is not restricted in scope to the discrete cosine transform. For video coding, any one of a number of transforms may be employed, such as the Haar transform, the Slant transform, and the Fourier transform, to name a few, for example. After transforming to the DCT domain, in this embodiment, the video frame is then quantized, such as by quantizer 130 illustrated in FIG. 1. In this particular embodiment, a scalar quantizer is employed, although the invention is not restricted to scope in this respect. As one example, a vector quantizer may be employed. Likewise, as illustrated in FIG. 1, a quantization step $q_0$ is employed by quantizer 130. The output signal samples of the quantizer are then employed to produce a base layer bitstream, after additional processing not illustrated in FIG. 1. For example, as is well-known, after quantization, run length encoding using a zig-zag approach may occur and then variable length encoding, such as Huffman coding, for example, may occur. Likewise, the output signal samples produced by the variable length encoder are typically multiplexed with other binary digital signals, such as for audio signals, for example, for transmission over a communications channel or medium. Likewise, as will be discussed in greater detail hereinafter, at the receiving end of the communications channel, the received bitstream is demultiplexed and then processed to decode the received signal samples. See, the previously referenced text *Techniques and Standards for Image, Video, and Audio Coding*, for example.

As illustrated in FIG. 1, for this particular embodiment, the output signal samples produced by quantizer 130 are also provided to inverse quantizer 140 for reconstruction. As is well-known, inverse quantizer 140 does not produce a perfect replication of the signal samples applied to quantizer 130 due to quantization error. Quantization error will be discussed in greater detail hereinafter. After inverse quantization, for this embodiment, the signal samples are then transformed back from the discrete cosine transform domain to the spatial domain. The inverse discrete cosine transform (IDCT) is applied by block 150. The resulting signal samples may then be summed at node 160 with output signal samples produced by motion estimator 110. As is well-known, if this particular frame is intra-frame coded, motion estimator 110 will not provide signal samples to be summed with the output signal samples produced by block 150; however, if this particular frame is inter-frame coded, then motion estimator 110 will provide a frame to be summed with the output signal samples provided by block 150. Therefore, when inter-frame coding is employed, the differences between a prior frame and the current frame are coded. Block 150 provides an approximation to these differences and these differences are summed at node 160 with an approximation of the prior frame that produced the differences approximated by motion estimator 110. Likewise, for the base layer, the result of summing the signal samples produced by motion estimator 110 and the signal samples produced by block 150 are then provided to frame reconstruction block 170 to provide an estimate of the next frame to be employed by motion estimator 110 for inter-frame coding.

As is well-known, so far what has been described with respect to the base layer relates to a coder that is consistent with ITU-T Draft Recommendation H.263. Therefore, the base layer produced by an embodiment of a multi-layer coder in accordance with the present invention is fully compatible with this standard. Likewise, although the previous description was provided in terms of video frames, the invention is not restricted in its scope to processing signal samples as video frame groupings of signal samples. Any convenient grouping of signal samples may be processed so long as the processing performed ensures that adjustments are made to the processing for the size of the grouping employed. For example, although the invention is not restricted in scope in this respect, and as is well-known, for H.263, for example, a frame may be divided into groups of blocks (GOB), groups of blocks may be divided into macroblocks (MB), and macroblocks may be divided into square blocks having dimensions eight pixels by eight pixels, for example. Likewise, as is well-known, although the invention is not restricted in scope in this respect, a video frame may be decomposed into three color-space components, in this particular embodiment y, u, and v color-space components. Likewise, the intensity at each pixel location may be represented by using eight bits, for example, although again the invention is not restricted in scope in this respect. Therefore, in this particular embodiment, each video frame may be represented by three frames, one for each color-space component and each of these color-space component frames may be processed by the embodiment of a multi-layer coder illustrated in FIG. 1. Likewise, as previously described, each of these color-space component frames may be processed in groupings rather than on a frame-by-frame basis. For this particular embodiment, however, the signal samples are processed in macroblock groupings.

As illustrated in FIG. 1, in this particular embodiment, node 145 obtains the differences between the signal samples applied to quantizer 130 and the output signal samples produced by inverse quantizer 140. These differences produce quantization error signal samples. In this context, "quantization error signal samples" refers to signal samples representing differences between signal samples applied to a quantizer and output signal samples produced by an inverse quantizer. As further illustrated in FIG. 1, reference 180, designated "ref 1" in FIG. 1, may also be applied to node 145 to produce adjusted quantization error signal samples, as will be explained in more detail hereinafter.

Reference 180 includes reference quantization error signal samples. In FIG. 1, reference 180 is shown applied to node 145 via a dotted line. This dotted line illustrates that in this particular embodiment reference 180 may not always be applied to node 145. In this particular embodiment, a predetermined criterion or threshold is applied to the quantization error signal samples. If the quantization error for the signal samples exceeds a threshold value, then reference quantization error signal samples for reference 180 are subtracted from the quantization error signal samples. However, if the quantization error does not exceed this threshold value, then reference 180 is not employed. It will, of course, be appreciated that the threshold value itself may vary, such as with transmission rate, for example. In this embodiment, the absolute value of the quantization error signal samples minus an average quantization error signal sample for a particular grouping are summed over the particular grouping to determine whether the predetermined threshold is exceeded or not. However, the invention is not restricted in scope in this respect. Any one of a number of criteria to measure quantization error may be employed, such as sum of the squares or weighted sum of the squares, for example.

If the quantization error is sufficiently large, then it is desirable to reduce the magnitude of the quantization error signal samples. This is one reason for applying a predetermined criterion and threshold. The quantization error signal samples are reduced by reference quantization error signal samples to reduce the magnitude of the quantization error signal samples to be quantized by quantizer 190. In this context, these are referred to as adjusted quantization error signal samples and, therefore, also constitute quantization error signal samples. This adjustment effectively reduces the amount of information to be transmitted across the communications channel. However, if the quantization error is sufficiently small, then the quantization error signal samples are not quantized. Since, as previously described, the bandwidth of the communications channel is a resource to be employed efficiently, it is desirable to reduce the amount of information to be transmitted across it, if this may be accomplished without a substantial degradation in the quality of the video frame being transmitted, for example. Therefore, instead, the reference quantization error signal samples are employed as an approximation to the quantization error signal samples.

As FIG. 1 illustrates, where the reference quantization error signal samples are subtracted from the quantization error signal samples at node 145, the resulting quantization error signal samples are quantized by quantizer 190 to produce quantized signal samples that may be employed to produce a layer two bitstream. As previously described with respect to the base layer in this embodiment, the quantized signal samples produced by quantizer 190 may be applied to a run length encoder and a variable length encoder, as is well-known. Likewise, resulting binary digital signal samples or bits may be multiplexed with other binary digital signal samples before transmission across the communications channel.

As illustrated in FIG. 1, the quantized signal samples produced by quantizer 190 are, likewise, provided to inverse quantizer 125 for reconstruction. This is similar to quantizer 130 and inverse quantizer 140, previously discussed with respect to the base layer. Likewise, node 155 is similar to previously discussed node 145. Therefore, quantization error signal samples are produced at node 155 in this particular embodiment.

Layer two includes summing node 135, forming a loop in which reference 180 is updated by the signal samples produced by inverse quantizer 125, as illustrated in FIG. 1. Reference quantization error signals 180 are provided to summing node 135 to be summed with the signal samples produced by inverse quantizer 125, regardless of whether reference quantization error signals are applied to node 145 in this embodiment, as previously discussed. Therefore, reference 180 continues to be updated for each successive frame of video signal samples. In this context, "reference quantization error signal samples" comprise the sum of the inverse quantized previously transmitted quantization error signal samples. Processing performed to produce quantization error signal samples for layer two is performed entirely in the transform domain in this embodiment. This provides a number of advantages as will be discussed hereinafter.

As FIG. 1 illustrates, an embodiment of a method of producing quantization error signal samples for a layer of a multi-layer coder applied to successive video frames in accordance with the invention comprises of processing in the transforming domain quantization error signal samples produced by the immediately preceding layer. This processing includes using reference quantization error signal samples if the quantization error for the quantization error signal samples exceeds a predetermined threshold or criterion, although this may vary as previously indicated. More specifically, the reference quantization error signal samples are subtracted, as previously described. For layer two, for example, quantization error signal samples produced by the base layer are processed in the transform domain. Although not explicitly illustrated in FIG. 1, if reference quantization error signal samples are transmitted, then the bitstream transmitted across the communications channel should indicate this so that during reconstruction at the receiving end, the appropriate reference quantization error signal samples may be employed to reproduce the quantization error signal samples, as shall be described in greater detail hereinafter. This may be signaled by using a bit flag in the bitstream, for example.

Layer three is similar to layer two. As illustrated in FIG. 1, layer three includes quantizer 165, inverse quantizer 175, summing node 185, reference 115, and node 155. Therefore, quantization error signal samples are produced at node 155 by taking the difference of the signal samples applied to quantizer 190 and the signal samples produced by inverse quantizer 125. Likewise, reference quantization error signal samples may be subtracted from the quantization error signal samples based, at least in part, upon a predetermined criterion, as previously discussed. Reference quantization error signal samples are provided by reference 115, designated "ref 2," as illustrated in FIG. 1. The quantization error signal samples produced at node 155, whether the reference quantization error signal samples have been subtracted or not, are quantized by quantizer 165 to produce the layer three signal samples. As illustrated in FIG. 1, quantizer 165 employs a quantization step size, $q_2$. Likewise, quantizer 190 employs a step size, $q_1$, and quantizer 130 employs a step size, $q_0$. Step size selection affects the quality of the video frames produced at the receiving end of the communications channel. Typically, decreasing quantization step sizes will be employed as additional layers of the multi-coder are utilized, although the invention is not restricted in scope in this respect. As discussed with respect to the base layer and layer two, signal samples produced by quantizer 165 will undergo additional processing, such as run length encoding, variable length encoding, and multiplexing, for transmission across a communications channel. Furthermore, layer three quantization error signal samples are also provided to inverse quantizer 175 and the inversed quantized signal samples are provided to summing node 185. As discussed with respect to layer two, reference 115 is continually updated by these inverse quantized signal samples.

Figure 3:
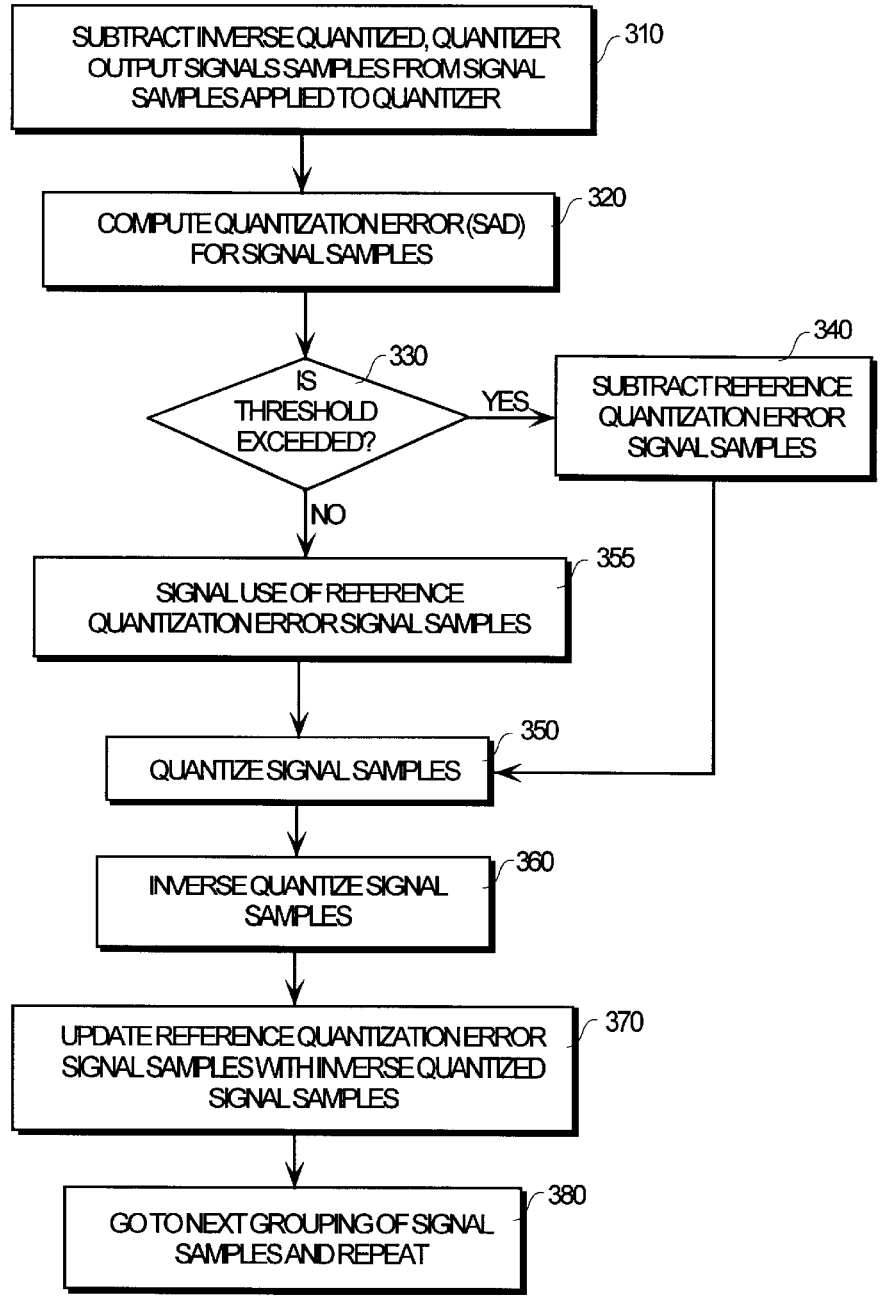
FIG. 3 is a flowchart illustrating a portion of an embodiment of a method for performing multi-layer coding in accordance with the invention.

FIG. 3 is a flowchart illustrating a portion of an embodiment for a method for performing multi-layer coding in accordance with the present invention. In this particular embodiment, the flowchart of FIG. 3 may be applied to any layer where n is a positive integer, for each grouping of each frame. Therefore, here, the flowchart is applied to macroblocks. For layer two, 310 begins at node 145 in FIG. 1. Likewise, for layer three, 310 begins at node 155. Likewise, not explicitly illustrated in FIG. 1, at 320 the quantization error for the grouping or signal samples is computed or determined. In this particular embodiment, the sum of absolute differences (SAD) is employed, although the invention is not limited in scope in this respect. At 330, a comparison is made to assess whether a threshold for the SAD is exceeded. If the SAD is not exceeded, then the grouping is not coded and a bit is transmitted to signal the receiving end. If alternatively, the threshold is exceeded, as previously discussed, and illustrated at 340, reference quantization error signal samples are subtracted. In FIG. 1, this is again performed at node 145 for layer two (or 155 for layer three). After subtraction of the reference quantization error signal samples in 350 the quantization error signal samples are quantized. This is illustrated in FIG. 1 by block 190 for layer two or by block 165 for layer three. These quantized signal samples are inverse quantized in 360. This is illustrated in FIG. 1 by block 125 for layer two and block 175 for layer three. Next, in 370, the reference quantization error signal samples are updated. This is illustrated in FIG. 1 by node 135 for layer two and node 185 for layer three. As illustrated by 380, this process is repeated for the next grouping of signal samples, in this embodiment the next macroblock. Of course, in this embodiment, once all the macroblocks for a particular frame are processed, the next frame is processed.

The embodiment of a multi-layer coder in accordance with the invention as illustrated in FIG. 1 provides a number of advantages. One advantage is that the refinement achieved by employing successive layers is performed in the transform domain rather than the pixel domain. In this particular embodiment, it is performed in the DCT domain, although the invention is not restricted in scope in this respect. This results in significant savings in the complexity of the coder and/or decoder. For each layer, motion estimation and inverse transform processing is not employed, which typically comprises a significant portion of the computational complexity of a coder and/or decoder. In contrast, much of the remaining processing is table driven and, therefore, does not result in significant computational complexity. Likewise, when applied to multiple layers, this reduction in complexity is even greater when compared with conventional SNR scalability, for example, such as previously discussed. Another advantage is that, for each layer, a different quantizer, such as a quantizer employing a different step size, may be used to quantize the quantization errors introduced by the immediately preceding layer, thus permitting finer granularity control at each layer for a given bandwidth, for example. This also provides improved resiliency than the current H.263 approach because error propagation across layer boundaries is reduced and, furthermore, the loss of high layers does not result in an unusable bitstream. Furthermore, graceful degradation is achieved in the presence of packet loss because the degradation is proportional to the reduction in bandwidth, for example. Other advantages include: the number of layers is not limited and may be extended; the quality of the decoded frames increases as more layers are decoded; and the layers may be selected dynamically according to bandwidth and signal sample rate preferences. For example, this approach provides a more flexible rate allocation than the wavelet approach. For an embodiment in accordance with the present invention, on the receiving side, the quality of the decoded video images may be adjusted by having different numbers of layers being decoded. Likewise, the number of layers may be selected to be transmitted or received according to available resources.

Figure 2:
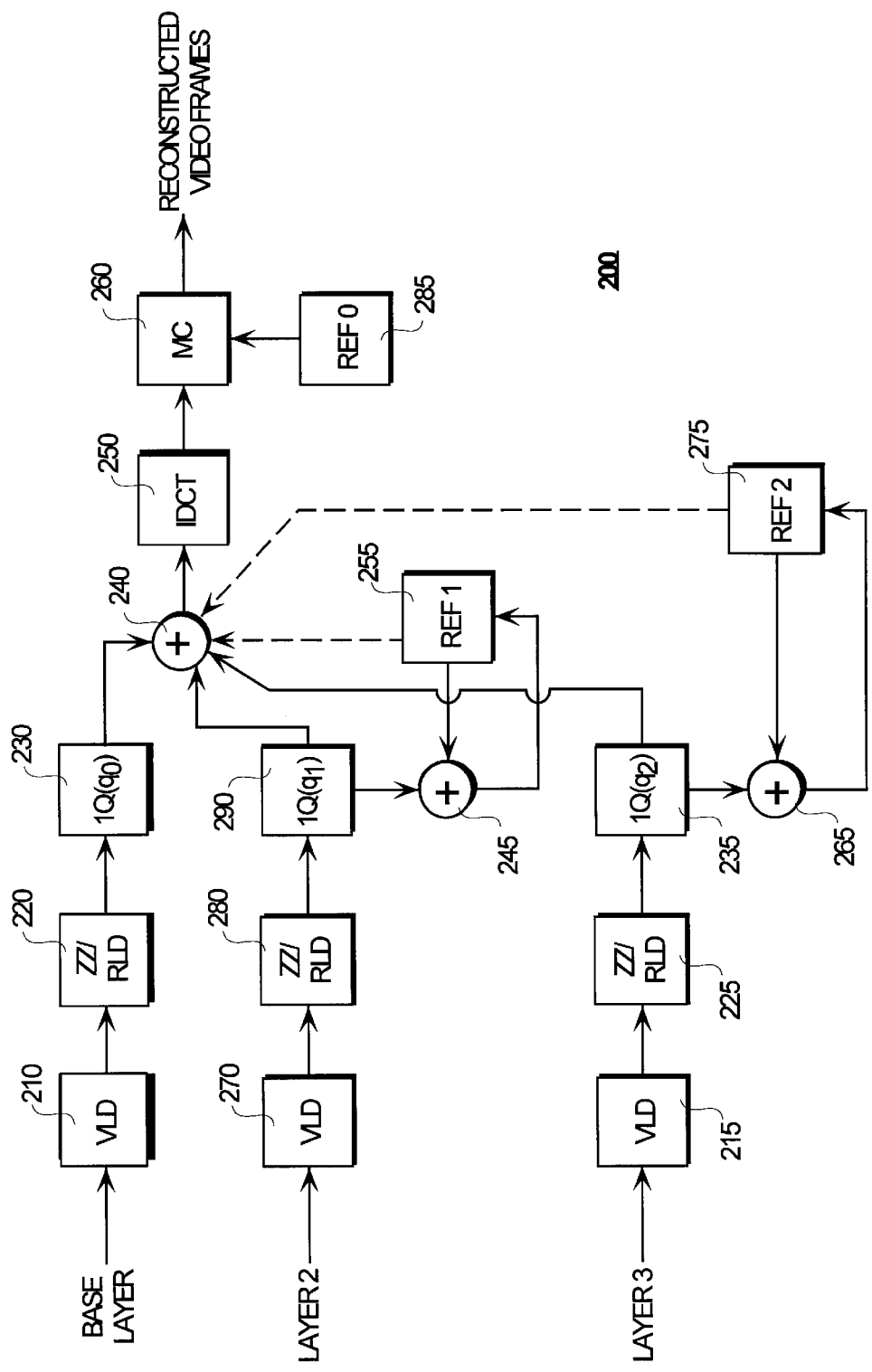
FIG. 2 is a schematic diagram illustrating an embodiment of a multi-layer decoder in accordance with invention.

FIG. 2 is a block diagram illustrating an embodiment of a multi-layer decoder in accordance with the invention. Typically, embodiment 200 will be employed at the receiving end of a communications channel in which the bitstream transmitted across the communications channel or medium includes binary digital signals that have been coded by a multi-layer coder, such as the embodiment illustrated in FIG. 1, for example. However, as previously described, additional processing will typically be employed in addition to the coding imparted by embodiment 100. In FIG. 2, embodiment 200 is illustrated as receiving a base layer stream of signal samples, a layer two stream of signal samples, and a layer three stream of signal samples, although the invention is not limited in scope in this regard. FIG. 2 illustrates a variable length decoder and a run length decoder for each layer. As previously discussed, variable length decoding and run length decoding are well-known and will not be described further in this context. However, it will be noted that the variable length decoder and run length decoder are applied to the received bit stream in the reverse order in which run length encoding and variable length encoding are applied at the transmitting end of the communications channel.

As illustrated in FIG. 2, inverse quantizer 230 is applied to the quantization signal samples produced. In this particular embodiment, inverse quantizer 230 is applied with step size $q_0$, corresponding to the step size employed by the quantizer at the transmitting end of the communications channel. If no additional layers are employed beyond the base layer, then the inverse quantized signal samples are inverse transformed, such as by block 250, and motion compensated, such as by block 260, to produce the reconstructed video frames. This portion of the decoder is well-known and complies with the H.263 standard, as previously discussed with respect to the base layer of embodiment 100.

Where quantized signal samples for additional layers are received and decoded in addition to the base layer, in this particular embodiment these quantized signal samples are decoded and summed with the base layer at node 240 prior to inverse transforming the quantized signal samples and prior to motion compensating the quantized signal samples to produce the reconstructed video frames. For example, referring to layer two, after variable length decoding and run length decoding, the signal samples received for this layer are inverse quantized by inverse quantizer 290 employing step size $q_1$. However, as was illustrated with respect to embodiment 100, for layer two, reference quantization error signal samples were subtracted prior to quantization by quantizer 190. Therefore, at the receiving end of the communications channel, reference quantization error signal samples should be added to the inverse quantized signal samples at node 240 where reference quantization error signal samples were subtracted before transmission across the communications channel. As previously described, typically the received bit stream will include bits or binary digital signals to indicate those signal samples in which reference quantization error signal samples are employed as an approximation. These bits are employed at the receiving end to determine when inverse quantized reference quantization error signal samples are to be summed at node 240 with other inverse quantized error signal samples. Therefore, in FIG. 2, a dotted line is illustrated from reference 255 to summing node 240. However, whether reference 255 is summed at node 240 with the inverse quantized signal samples or not, reference 255 is continually updated at summing node 245 by inverse quantized signal samples produced by inverse quantizer 290. Thus, reference 255 is continually updated with inverse quantized arriving quantization error signal samples. This loop employing node 245 and reference 255 is similar to the loop in embodiment 100 employing reference 180 and summing node 135. However, whereas signal samples from reference 180 were subtracted from the quantization error signal samples prior to quantization, at the receiving end of the communications channel signal samples from reference 255 are added to the quantization error signal samples after inverse quantizing by inverse quantizer 290. Likewise, in this embodiment, layer three employs a similar approach as just described with respect to layer two. Therefore, inverse quantizer 235 employs step size $q_2$ and the inverse quantized signal samples are produced or provided to summing node 240 and to summing node 265. Likewise, reference 275 is continually updated by a loop similar to the loop described in layer two with respect to summing node 245 and reference 255. Furthermore, once these respective layers or other appropriate layers are summed at summing node 240 to produce signal samples in the transform domain, these signal samples are inverse transformed by block 250 and then motion compensated by block 260. As illustrated, a reference video frame 285 is applied to motion compensator 260 to produce reconstructed video frames, as desired.

Figure 4:
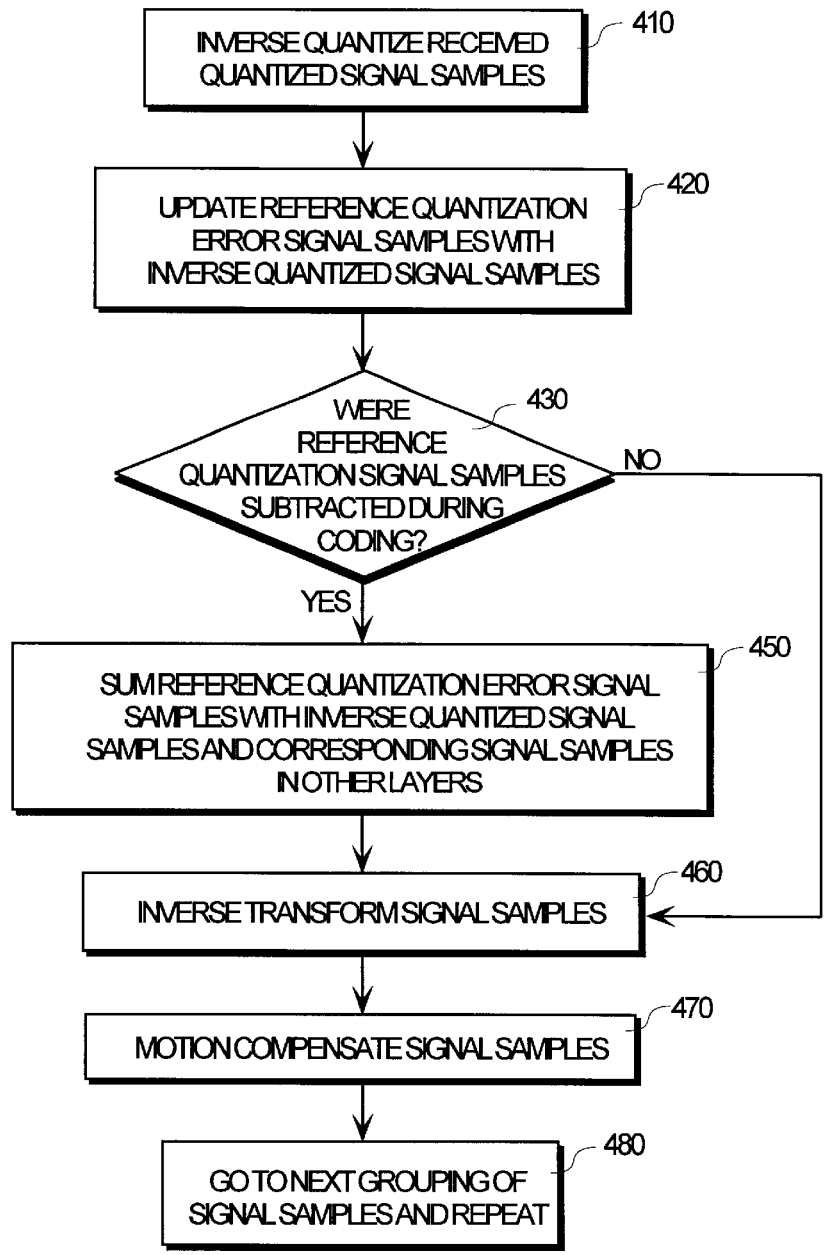
FIG. 4 is a flowchart illustrating a portion of an embodiment of a method for performing multi-layer decoding in accordance with the invention.

FIG. 4 is a flowchart illustrating a portion of an embodiment of a method for performing multi-layer decoding in accordance with the present invention. In this particular embodiment, flowchart 4A–4B may be applied to any layer n, where n is a positive integer, for each grouping of each frame. Therefore, here the flowchart is applied to macroblocks. For layer two, 410 begins at block 290 in FIG. 2. Likewise, for layer three, 410 begins at block 235. Likewise, at 420, reference quantization error signal samples are updated with the inverse quantized signal samples. This is illustrated in FIG. 2 at node 245 for layer two and 265 for layer three. At 430, a determination is made whether for the particular grouping, or in this case the particular macroblock being processed, reference quantization error signal samples were subtracted during coding prior to transmission across the communication medium. If so, illustrated at 450, the reference quantization signal samples are summed with the inverse quantized signal samples and corresponding signal samples for this macroblock in other layers. Alternatively, if not, although the invention is not limited in scope in this respect, a bit in the received bitstream may signal this information, for example. At 450, the inverse quantized reference quantization error signal samples are summed with the corresponding signal samples for this macroblock in other layers. In FIG. 2, these summations are illustrated by node 240. At 460 and 470, the resulting signal samples are inverse transformed and motion compensated if inter-coded. This is illustrated in FIG. 2 by blocks 250 and 260. This produces the reconstructed macroblock in this particular embodiment. The next macroblock for this frame is then processed. Likewise, once a frame has been reconstructed, the next frame is processed.

Once these respective layers of signal samples are produced, such as by embodiment 100, for example, they may be transmitted across a communication medium by a variety of techniques. For example, if the Internet is employed, then an Internet Protocol (IP) multicasting approach may be utilized. For example, each layer may correspond to a specific Internet address which the receiving end may subscribe to or access. Therefore, depending upon the quality of the video desired, additional layers may be subscribed to and processed, such as illustrated by the embodiment of FIG. 2. Thus, for several layers corresponding bits may be transmitted and time-stamped, for example, to be received and reconstructed at various Internet addresses. Alternatively, if an Integrated Services Digital Network (ISDN) communications channel is employed, the number of channels may correspond to different layers. Thus, depending upon the desired bandwidth, you may receive more or less channels via the ISDN line.

As previously discussed, an aspect of an embodiment a multi-layered coder and/or decoder in accordance with the present invention relates to the selection of step size for the quantizers for the multi-layers. A number of approaches may be employed. Therefore, the invention is not limited in scope to a particular approach. Ultimately, the step size selected may affect the loss of information prior to transmission. However, where limited resources are available, trade-offs are typically employed. Because some uncertainty exists regarding the nature of the image to be coded, heuristics may be employed to determine the quantization step size to apply. One approach is to "train" the coder by applying the coder to randomly selected scenes for a variety of quantization step sizes and use the statistics obtained for the resulting bit lengths to make determinations regarding quantization step size. Once the training has been completed, for a given frame, for example, the quantized step size may be selected dynamically based at least in part on the actual number of bits produced by coding the particular frame, or frame macroblock in this embodiment.

Figure 5A:
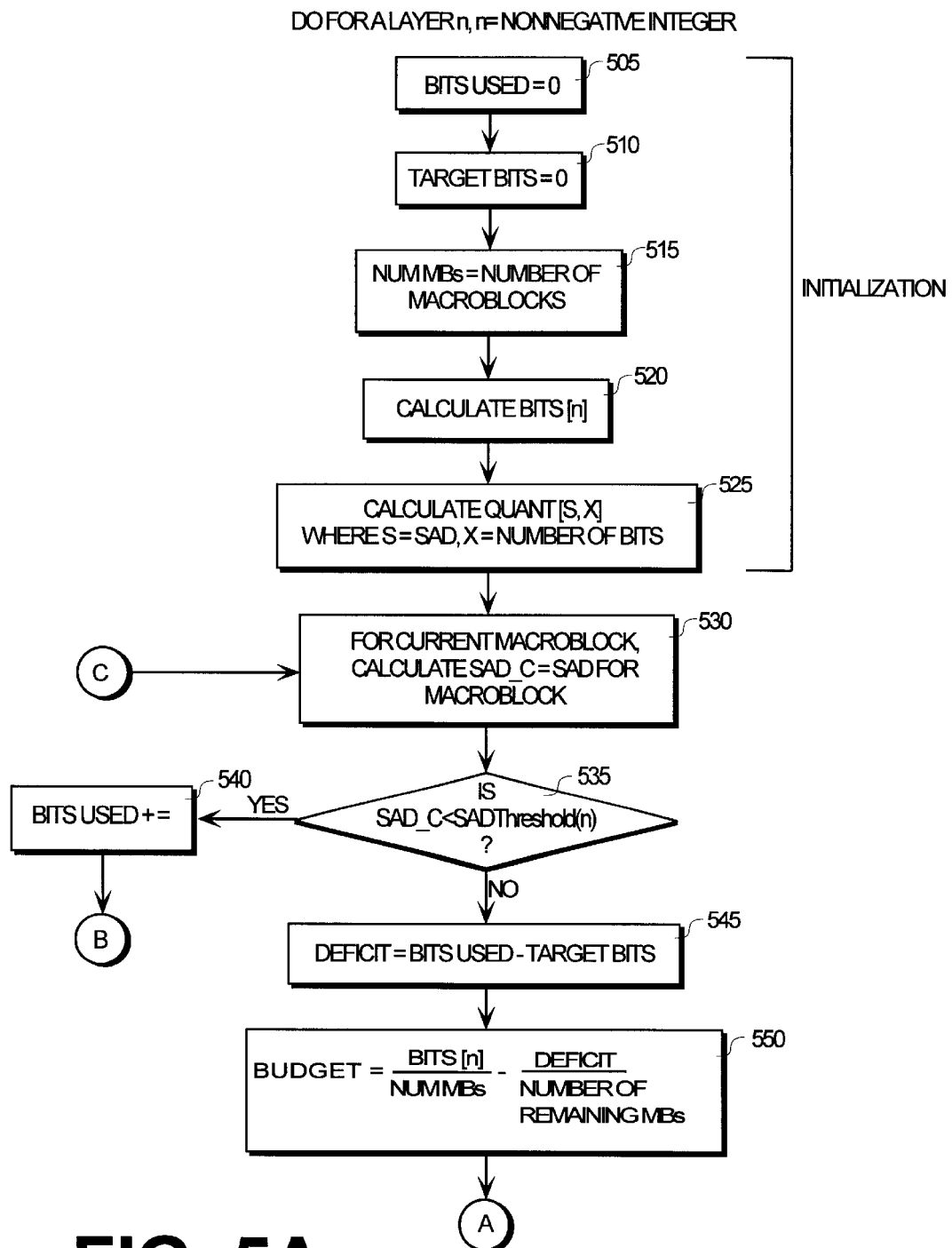
FIGS. 5A and 5B are a flowchart illustrating a portion of an embodiment of a method for selecting the step size
Figure 5B:
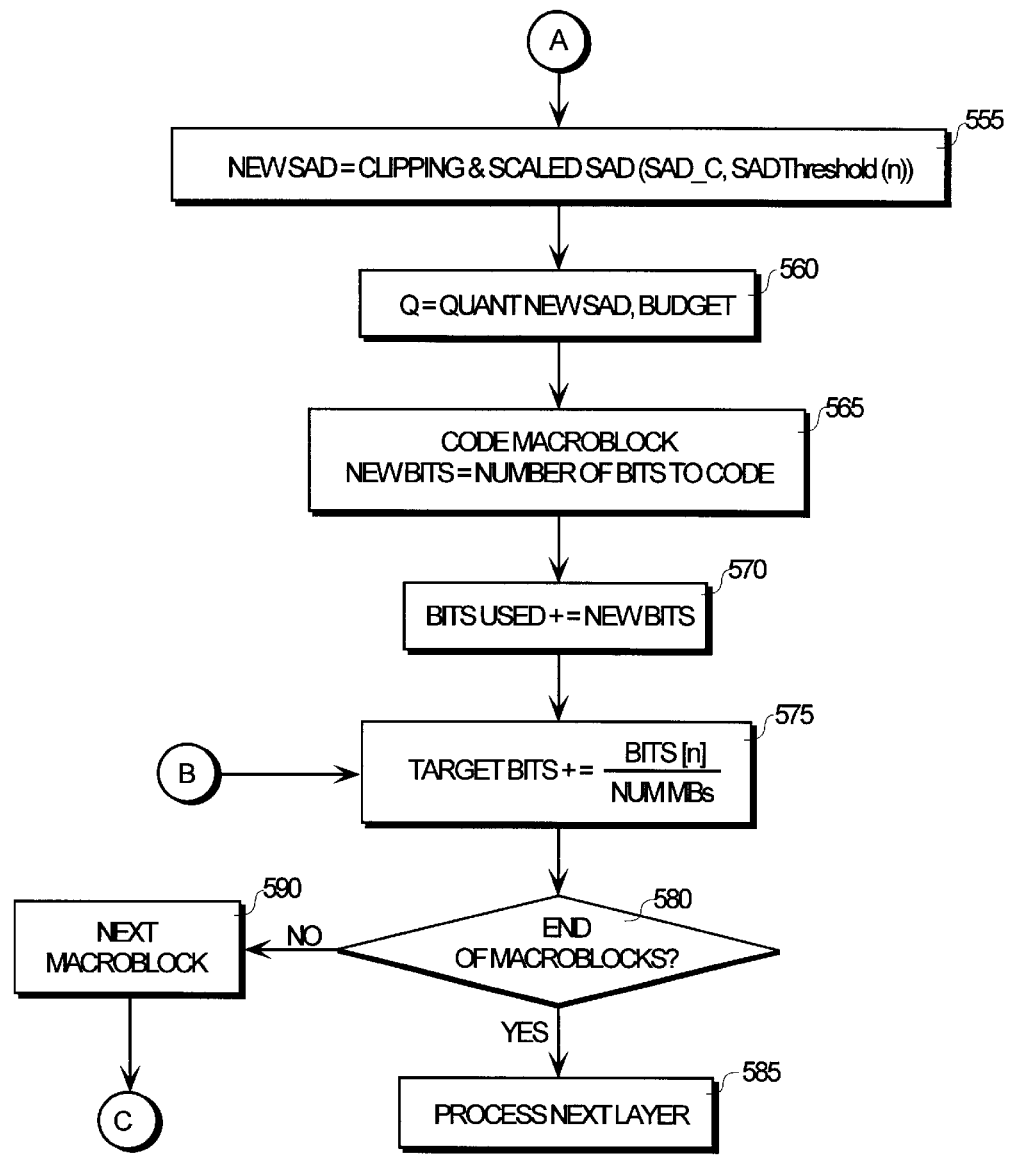

FIGS. 5A and 5B are a flowchart illustrating a portion of an embodiment of a method for selecting step size quantization level for a method of performing multi-layer coding in accordance with the present invention. At 505–515, initialization is performed. In this particular embodiment, each layer shall employ a selected data signal rate. In this context, the rate is measured in bits per frame. Once the number of frame per second is known, this rate may be converted to bits per second. Typically, for each layer, the data signal rate for a particular layer is determined by the communications medium, such as a POTS line, an Internet connection, or an ISDN line, for example. Thus, in this particular embodiment, for a current frame, each layer has a given target bit rate. At 520, this is designated bits [n], where n is the particular layer beginning with one for the base layer. In this particular embodiment, the frame is processed in macroblock groupings as previously discussed, although the invention is not limited in scope in this respect, Therefore, the target bit rate in this embodiment is the target bit rate for the layer divided by the number of macroblocks. For a particular macroblock, the sum of absolute differences (SAD) for that macroblock is determined, designated "SAD_C". Of course, as previously indicated, another criteria may alternatively be employed in place of the SAD criteria. For a particular layer n, an SAD threshold is determined, designated "SAD Threshold(n)". Therefore, for an SAD below this threshold the macroblock is not coded. This is illustrated at 535 by the path to 540. This reduces the number of bits employed to code macroblocks that provide little signal sample information. However, for such a macroblock, at 540, a bit may be employed to signal to the receiving end that the macroblock was not coded. Furthermore, even if the SAD threshold is exceeded, nonetheless, fewer than the allocated number of bits may be sufficient to code the particular macroblock. Therefore, some bits may be allocated to other macroblocks so that less signal sample information is lost due to quantization for those other macroblocks. For example, the difference between the allocated number of bits and the actual number of bits employed may be calculated, as in 545, and allocated over the remaining macroblocks. Therefore, the quantizer step-size may be adjusted dynamically based, at least in part, on the particular frame. After initialization, this calculation is useful, as will be explained further. Depending on whether more bits are desired or fewer bits are desired based on the calculated SAD, the SAD for the macroblock is scaled in 555. The quantized step size is then selected for the scaled SAD using the increased or decreased number of bits now allocated to this macroblock, designated "budget", based at least in part upon accumulated image statistics, as in 560. For example, random scenes may be quantized using quantizers having 32 different step sizes. Based at least in part upon the SAD for the scenes and the number of resulting bits, an inverse function may provide the quantizer step size for a particular SAD and an available number of bits, as illustrated in 525 and designated "quant". This inverse function may then be employed to determine the quantizer step size in 560. Once the step size is selected, the macroblock may be coded using the selected step size, as in 565, and the actual number of bits used, in 570, may be employed to again compute the number of bits available for the remaining macroblocks so that the calculation may now be performed for the next macroblock, as in 590.

It will, of course, be appreciated that an embodiment of the invention may likewise be implemented in software. For example, a computer-readable storage medium, such as a hard-drive or a disk, for example, may include stored instructions. These stored instructions, when executed by a processor, such as a microprocessor, for example, may result in the processor performing an embodiment of a method in accordance with the invention, as previously described and illustrated.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of producing quantization error signal samples for a layer of a multi-layer coder applied to successive video frames, said method comprising:
   processing in a transform domain quantization error signal samples produced by an immediately preceding layer, the processing including using reference quantization error signal samples if a measured quantization error for the quantization error signal samples exceeds a predetermined criterion.

2. The method of claim 1, wherein the quantization error signal samples correspond to a particular color-space component of a particular video frame.

3. The method of claim 1, wherein the transform domain comprises the discrete cosine transform (DCT) domain.

4. The method of claim 1, wherein the base layer of the multi-layer coder comprises an H.263 compliant coder; said layer of a multi-layer coder comprising a layer other than the base layer.

5. The method of claim 1, wherein processing in the transform domain includes in the transform domain subtracting reference quantization error signal samples from the quantization error signal samples to produce adjusted quantization error signal samples.

6. The method of claim 5, wherein processing in the transform domain includes quantizing in the transform domain the adjusted quantization error signal samples.

7. The method of claim 6, and further comprising: updating in the transform domain the reference quantization error signal samples.

8. The method of claim 7, wherein updating includes inverse quantizing in the transform domain the adjusting quantization error signal samples and adding the inverse quantized signal samples to the reference quantization error signal samples.

9. The method of claim 1, wherein processing in the transform domain includes quantization at a dynamically adjustable quantization step size.

10. The method of claim 9, wherein the quantization step size is adjusted dynamically, based at least in part on the particular video frame.

11. The method of claim 1, wherein the processing of the quantization error signal samples includes applying an inverse transform in only one layer of the multi-layer coder.

12. The method of claim 11, wherein the one layer comprises the base layer.

13. The method of claim 1, wherein the processing of the quantization error signal samples includes performing motion estimation in only one layer of the multi-layer coder.

14. The method of claim 13, wherein the one layer comprises the base layer.

15. The method of claim 1, wherein base layer quantization error signal samples comprise the difference between base layer transformed signal samples and transformed signal samples after quantization and inverse quantization.

16. A method of reconstructing quantized signal samples in the transform domain for a layer of multi-layer decoder other than the base layer, said method comprising:

inverse quantizing quantized signal samples in the transform domain; and summing the inverse quantized signal samples with previous signal samples inverse quantized in the transform domain for this layer if the previous signal samples were subtracted during coding, based on a predetermined criterion, in the transform domain to produce the signal samples.

17. The method of claim 16, wherein the quantized error signal samples correspond to a particular color-space component of a particular video frame.

18. The method of claim 16, wherein the transform domain comprises the discrete cosine transform (DCT) domain.

19. The method of claim 16, wherein the base layer of the multi-layer decoder comprises an H.263 compliant decoder.

20. An article comprising: a computer-readable storage medium having stored thereon instructions that, when executed by a processor, result in the processor performing: processing for a layer of a multi-layer coder applied to successive video frames, in a transform domain, quantization error signal samples produced by an immediately preceding layer, the processing including using reference quantization error signal samples if the quantization error for the signal samples exceeds a predetermined criterion.

21. The article of claim 20, wherein the quantization error signal samples correspond to a particular color-space component of a particular video frame.

22. The article of claim 21, wherein processing in the transform domain includes quantization at a dynamically adjustable quantization step size.

23. The article of claim 22, wherein the quantization step size is adjusted dynamically, based at least in part on the particular video frame.

24. The article of claim 20, wherein the transform domain comprises the discrete cosine transform (DCT) domain.

25. The article of claim 20, wherein the base layer of the multi-layer coder comprises an H.263 compliant coder; said layer of a multi-layer coder comprising a layer other than the base layer.

26. The method of claim 20, wherein processing in the transform domain includes in the transform domain subtracting reference quantization error signal samples from the quantization error signal samples to produce adjusted quantization error signal samples.

27. The article of claim 26, wherein processing in the transform domain includes quantizing in the transform domain the adjusted quantization error signal samples.

28. The article of claim 27, and further comprising: updating in the transform domain the reference quantization error signal samples.

29. The article of claim 28, wherein updating includes inverse quantizing in the transform domain the adjusting quantization error signal samples and adding the inverse quantized signal samples to the reference quantization error signal samples.

30. The article of claim 20, wherein the processing of the quantization error signal samples includes applying an inverse transform in only one layer of the multi-layer coder.

31. The article of claim 30, wherein the one layer comprises the base layer.

32. The article of claim 20, wherein the processing of the quantization error signal samples includes performing motion estimation in only one layer of the multi-layer coder.

33. The article of claim 32, wherein the one layer comprises the base layer.

34. The article of claim 20, wherein base layer quantization error signal samples comprise the difference between base layer transformed signal samples and transformed signal samples after quantization and inverse quantization.

35. An article comprising: a computer-readable storage medium having stored thereon instructions that, when executed by a processor, result in the processor performing: inverse quantizing, in a transform domain, signal samples for a layer of a multi-layer coder other than the base layer; and summing the inverse quantized signal samples with previous signal samples inverse quantized in the transform domain for this layer if the previous signal samples were subtracted during coding, based on a predetermined criterion, in the transform domain to produce the signal samples.

36. The article of claim 35, wherein the quantized signal samples correspond to a particular color-space component of a particular video frame.

37. The article of claim 35, wherein the transform domain comprises the discrete cosine transform (DCT) domain.

38. The article of claim 35, wherein the base layer of the multi layer decoder comprises an H.263 compliant coder; said layer of a multi-layer decoder comprising a layer other than the base layer.

* * * * *